US009020106B2

(12) United States Patent
Gupta et al.

(10) Patent No.: US 9,020,106 B2
(45) Date of Patent: Apr. 28, 2015

(54) EMERGENCY VIDEO CALLS

(71) Applicant: Verizon Patent and Licensing Inc., Basking Ridge, NJ (US)

(72) Inventors: Neer Gupta, Martinsville, NJ (US); Frank A. McKiel, Jr., Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 34 days.

(21) Appl. No.: 13/948,959

(22) Filed: Jul. 23, 2013

(65) Prior Publication Data

US 2015/0029295 A1    Jan. 29, 2015

(51) Int. Cl.
*H04M 11/00*    (2006.01)
*H04M 3/51*    (2006.01)
*H04N 7/14*    (2006.01)

(52) U.S. Cl.
CPC ............ *H04M 3/5116* (2013.01); *H04N 7/141* (2013.01)

(58) Field of Classification Search
CPC . H04M 3/5116; H04M 3/56; H04M 2242/14; H04M 2203/5009; H04L 67/18
USPC ...................................... 349/37–45
See application file for complete search history.

(56) References Cited

U.S. PATENT DOCUMENTS

| | | | | |
|---|---|---|---|---|
| 2009/0271831 | A1* | 10/2009 | Binno et al. | 725/93 |
| 2010/0296634 | A1* | 11/2010 | Schulzrinne et al. | 379/45 |
| 2011/0258266 | A1* | 10/2011 | Serra et al. | 709/206 |
| 2013/0272565 | A1* | 10/2013 | Fagundes et al. | 382/100 |
| 2014/0043423 | A1* | 2/2014 | Lindberg | 348/14.01 |

OTHER PUBLICATIONS

Clarke Canfield, "Upgrades to Bring Texting to Maine's 911 Network", www.pressherald.com/news/Upgrades-to-bring-texting-to-Maines-911-network.html, Jun. 22, 2013, 3 pages.
J. Rosenberg et al., "SIP: Session Initiation Protocol", Network Working Group, RFC: 3261, Jun. 2002, 244 pages.
J. Rosenberg et al., "An Offer/Answer Model with the Session Description Protocol (SDP)", Network Working Group, RFC: 3264, Jun. 2002, 23 pages.
H. Schulzrinne et al., "RTP: A Transport Protocol for Real-Time Applications", Network Working Group, RFC: 3550, Jul. 2003, 94 pages.
J. Peterson, "A Presence-based GEOPRIV Location Object Format", Network Working Group, RFC: 4119, Dec. 2005, 22 pages.
M. Handley et al., "SDP: Session Description Protocol", Network Working Group, RFC: 4566, Jul. 2006, 50 pages.

* cited by examiner

*Primary Examiner* — Melur Ramakrishnaiah

(57) ABSTRACT

A device is configured to identify an emergency call from a user device, determine that the user device is to be connected on a video call, and obtain first video call information associated with the user device, where the first video call information includes information that permits the video call to be established. The device is configured to receive emergency information associated with the emergency call, and to identify an emergency guidance device to which the user device is to be connected via the video call. The device is configured to obtain second video call information associated with the emergency guidance device, where the second video call information includes information that permits the video call to be established, and to provide information to connect the user device and the emergency guidance device via the video call, based on the first video call information and the second video call information.

20 Claims, 12 Drawing Sheets

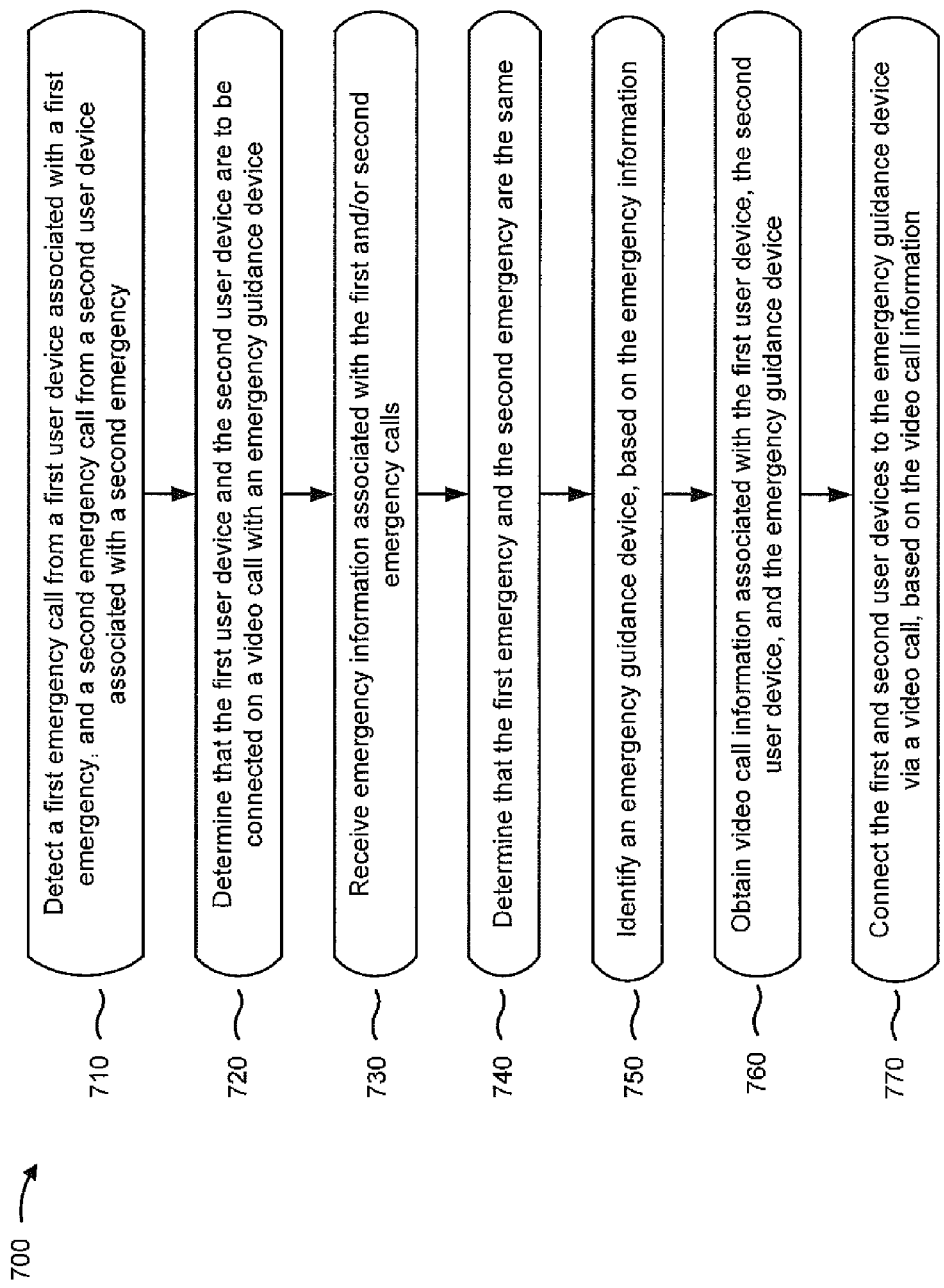

EMERGENCY VIDEO CALLS

BACKGROUND

Communication devices, such as landline telephones, cellular telephones, smartphones, and computer devices, may be used to place an emergency call to an emergency dispatcher. Based on the type of emergency experienced by a user of the communication device, the emergency dispatcher may send emergency personnel (e.g., fire, medical, police, etc.) to a scene of the emergency. The users may wait for the arrival of emergency personnel to receive assistance.

BRIEF DESCRIPTION OF THE DRAWINGS

FIG. 7 is a flow chart of an example process for aggregating video calls associated with an emergency;

DETAILED DESCRIPTION OF PREFERRED EMBODIMENTS

The following detailed description of example implementations refers to the accompanying drawings. The same reference numbers in different drawings may identify the same or similar elements.

A user of a user device, such as a smartphone, may experience an emergency that requires assistance from emergency personnel. The user may place an emergency call to an emergency dispatcher, and may relay some details about the nature of the emergency. Based on the nature of the emergency (e.g., whether the emergency is a fire emergency, a medical emergency, a police emergency, etc.) the dispatcher may send emergency personnel (e.g., a fire truck, an ambulance, a police cruiser, etc.) to the scene of the emergency. The user may be required to wait to receive assistance until emergency personnel arrive at the scene of the emergency.

Some emergencies, however, may require immediate assistance (e.g., the user may not be able to wait for the arrival of emergency personnel before taking some action to address the emergency). In this instance, the user may require direction, from a trained professional who can view the user and the user's surroundings, regarding how to provide assistance in the intervening minutes before emergency personnel arrive. Implementations described herein may allow a user, while awaiting the arrival of emergency personnel, to receive emergency guidance via a voice and/or video call.

Figure 1A:
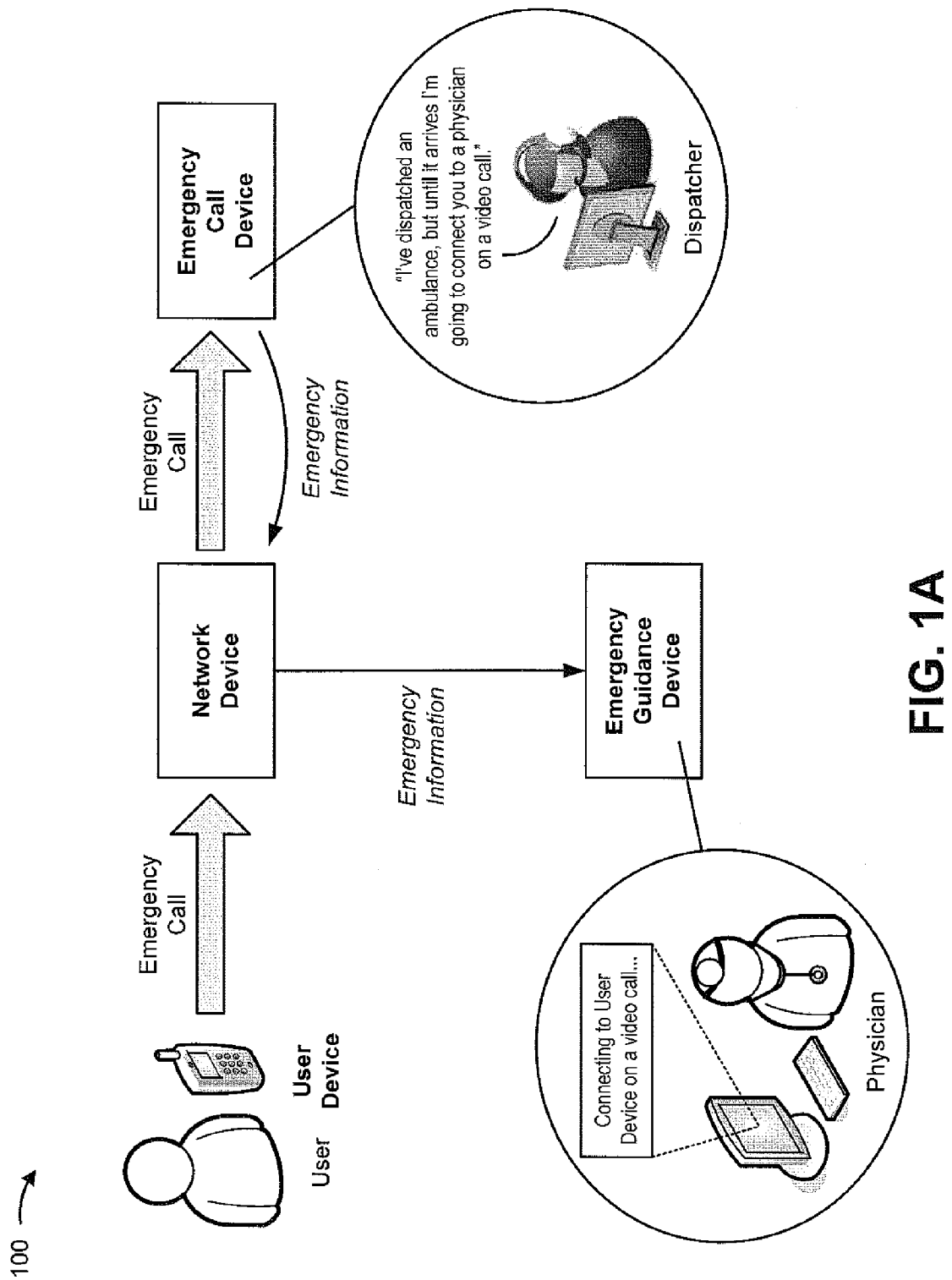
FIGS. 1A and 1B are diagrams of an overview of an example implementation described herein.
Figure 1B:
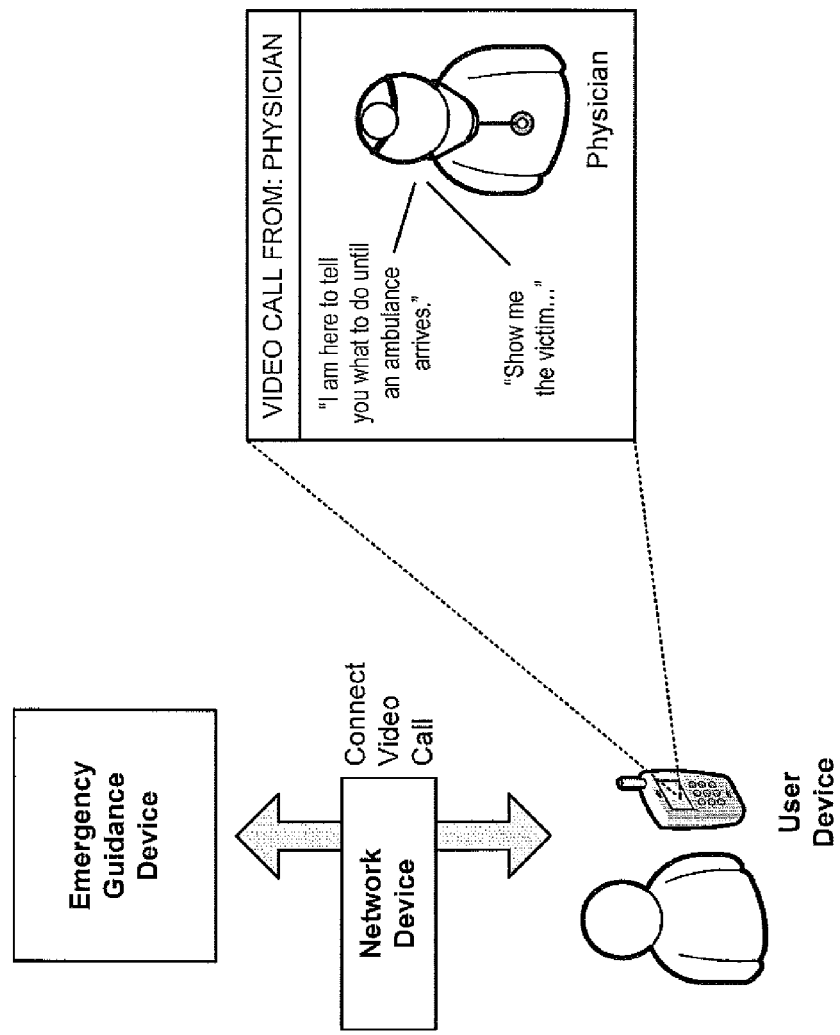

FIGS. 1A and 1B are diagrams of an overview of an example implementation 100 described herein. As shown in FIG. 1A, example implementation 100 may include a user, a user device, an emergency call device, a dispatcher, a network device, an emergency guidance device, and a physician. The user device may include a smartphone with video capabilities, the emergency call device may include an emergency call center, the network device may include a server, and the emergency guidance device may include a computer located in a hospital.

As shown in FIG. 1A, the user may use the user device to place an emergency call, via the network device, to the emergency call device. The emergency call device may receive emergency information (e.g., via a dispatcher working at the call center) identifying an emergency type (e.g., a medical emergency), and may dispatch an ambulance to a scene of the emergency. The emergency call device may also determine that the user device is to be connected to the emergency guidance device (e.g., a computer associated with a physician) via a video call, and send information to the network device necessary for a video call to be established. Additionally, or alternatively, the network device may determine, based on call information and/or emergency information received, that the user device is to be connected to the emergency guidance device via a video call.

As shown in FIG. 1B, the network device may use video call information to connect the emergency guidance device to the user device via a video call. The user device may display video of emergency personnel (e.g., the physician) associated with the emergency guidance device, and the emergency guidance device may display video of the user and/or the scene of the emergency.

In this manner, the user may receive guidance while awaiting the arrival of emergency personnel to the scene of the emergency, and emergency personnel may be able assess the emergency by viewing the user and the user's surroundings.

Figure 2:
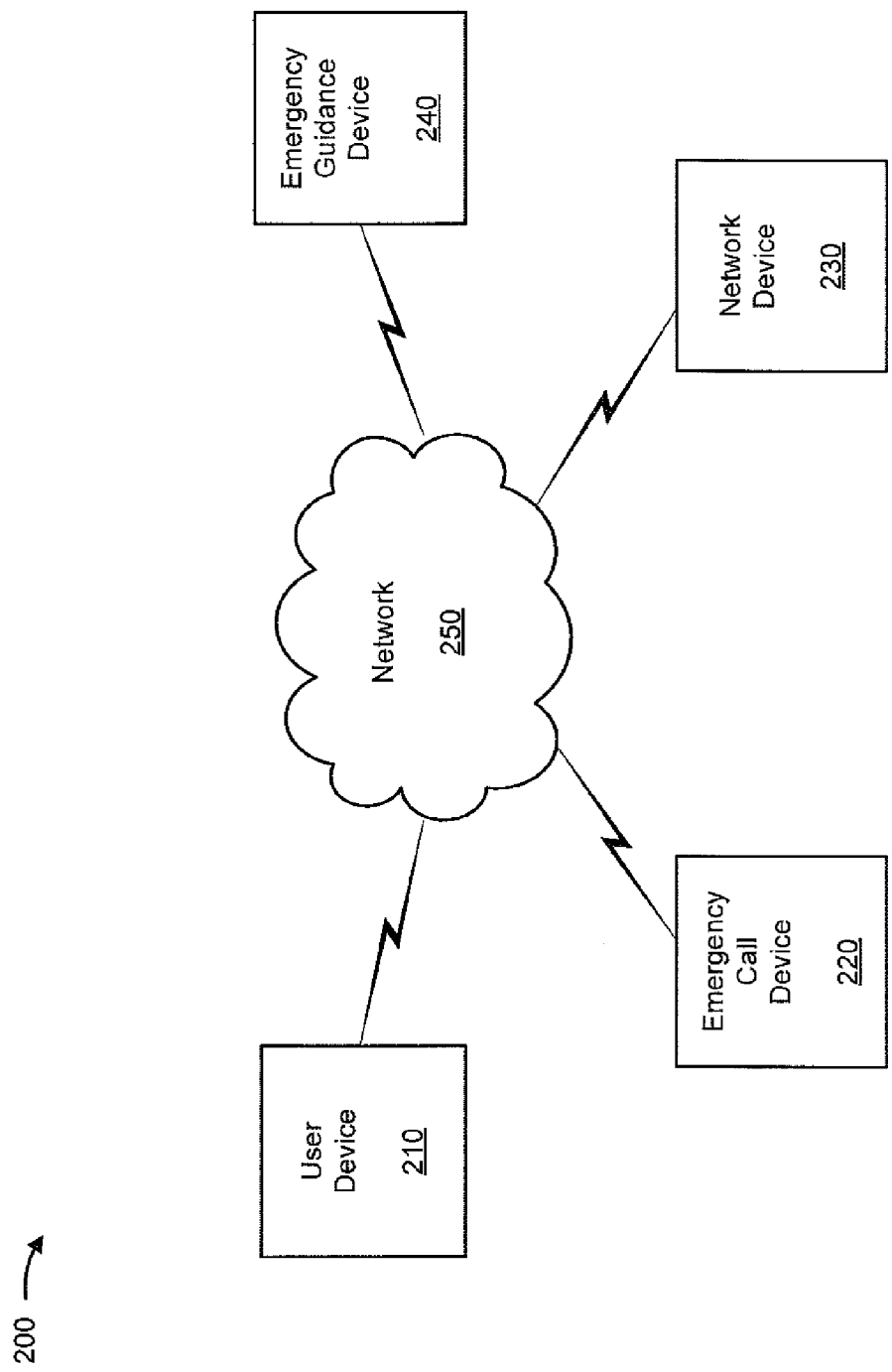
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, an emergency call device 220, a network device 230, an emergency guidance device 240, and a network 250. Devices of environment 200 may interconnect via wired connections, wireless connections, or a combination of wired and wireless connections.

User device 210 may include a device capable of making and/or receiving voice and/or video calls. For example, user device 210 may include a landline telephone, a mobile telephone (e.g., a smartphone, a radiotelephone, etc.), a computing device (e.g., a desktop computer, a laptop computer, a tablet computer, a handheld computer, etc.), or a similar device. In some implementations, user device 210 may include a device associated with a video camera, a web camera, or the like.

Emergency call device 220 may include a device capable of making, receiving and/or returning voice and/or video emergency calls. For example, emergency call device 220 may include a landline telephone, a mobile telephone (e.g., a smartphone, a radiotelephone, etc.), a computing device (e.g., a desktop computer, a laptop computer, a tablet computer, handheld computer, etc.), a collection of communication devices (e.g., a call center), a public safety answering point (PSAP), or a similar device.

Network device 230 may include a device capable of connecting two or more communication devices on a video call. For example, network device 230 may include a computing device (e.g., a desktop computer, a laptop computer, a table computer, a handheld computer, etc.), a call session control function ("CSCF") server or another type of server device, a gateway, a switch, or the like.

Emergency guidance device 240 may include a device capable of making and/or receiving voice and/or video calls. For example, emergency guidance device 240 may include a landline telephone, a mobile telephone (e.g., a smartphone, a radiotelephone, etc.), a computing device (e.g., a desktop computer, a laptop computer, a tablet computer, a handheld computer, etc.), a collection of communication device (e.g., a call center), or the like. In some implementations, emergency guidance device 240 may include a device associated with emergency personnel (e.g., medical personnel, fire personnel, police personnel, etc.) capable of providing assistance with an emergency. Additionally, or alternatively, emergency guidance device 240 may include a device associated with a video camera, a web camera, or the like.

Network 250 may include one or more wired and/or wireless networks. For example, network 250 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
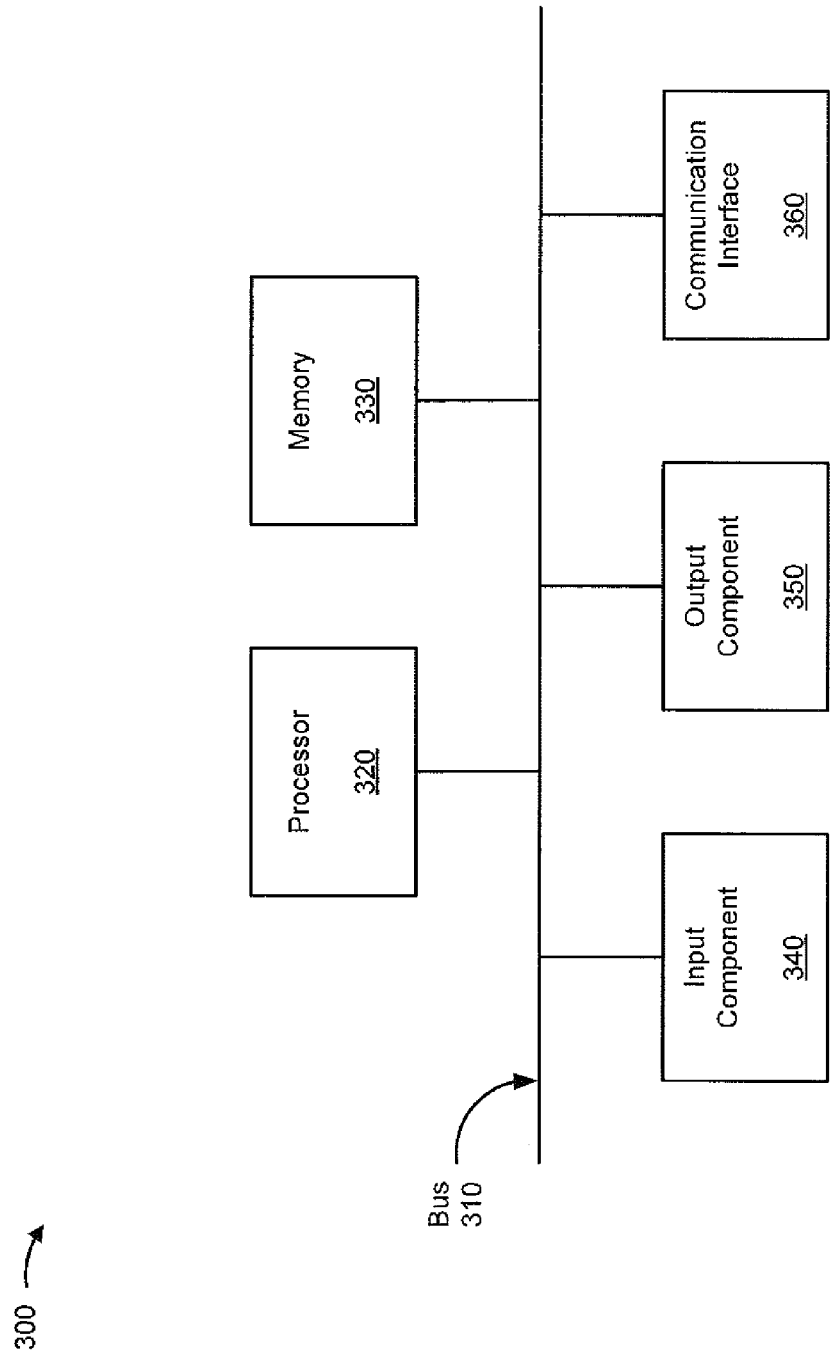
FIG. 3 is a diagram of example components of one or more devices of FIG. 2.

FIG. 3 is a diagram of example components of a device 300. Device 300 may correspond to user device 210, emergency call device 220, network device 230, and/or emergency guidance device 240. Additionally, or alternatively, each of user device 210, emergency call device 220, network device 230, and/or emergency guidance device 240 may include one or more devices 300 and/or one or more components of device 300. As illustrated in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing logic (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g. a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter that enables device 300 to communicate with other devices, such as via a wired connection, a wireless connection, or a combination of wired and wireless connections. For example, a communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
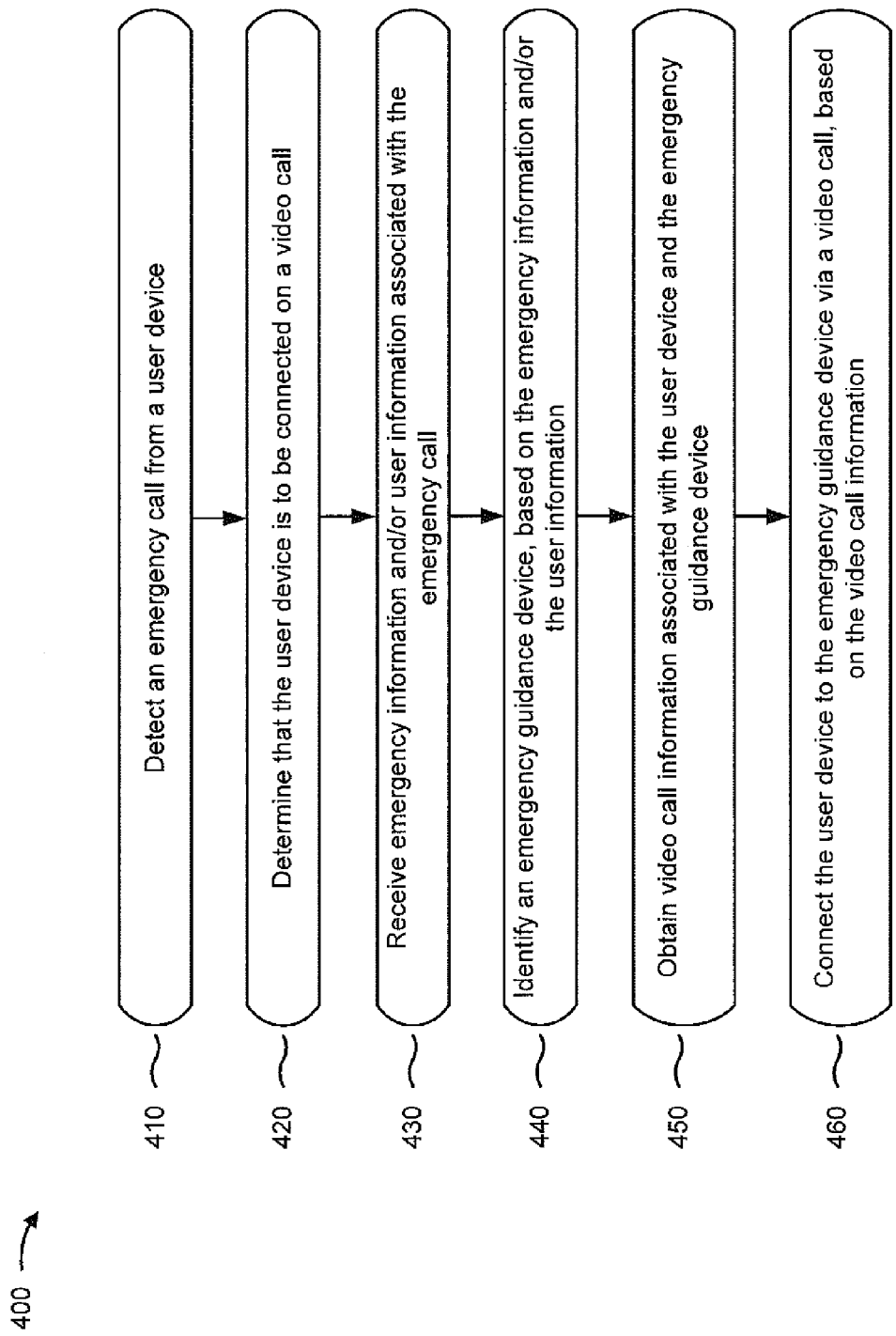
FIG. 4 is a flow chart of an example process for connecting a user device to an emergency guidance device via a video call.

FIG. 4 is a flow chart of an example process 400 for connecting a user device to an emergency guidance device via a video call. In some implementations, one or more process blocks of FIG. 4 may be performed by network device 230. Additionally, or alternatively, one or more process blocks of FIG. 4 may be performed by another device or group of devices separate from or including network device 230, such as user device 210, emergency call device 220, and/or emergency guidance device 240.

As shown in FIG. 4, process 400 may include detecting an emergency call from a user device (block 410). For example, network device 230 may detect the emergency call from user device 210. In some implementations, network device 230 may detect the emergency call by receiving a notification from emergency call device 220. For example, emergency call device 220 may include a public safety answering point (PSAP). Emergency call device 220 (e.g., the PSAP) may receive an emergency call from user device 210, and may send a notification to network device 230 indicating that user device 210 has placed the emergency call.

In some implementations, network device 230 may receive the emergency call from user device 210 (e.g., user device 210 may place the emergency call to emergency call device 220 via network device 230). For example, network device 230 may receive the emergency call and may connect user device 210 and emergency call device 220 on the emergency call. The emergency call may include a video call, and network device 230 may receive the video call from user device 210 and/or emergency call device 220 (e.g., user device 210 and/or emergency call device 220 may transmit and/or transfer the video call via network device 230).

As further shown in FIG. 4, process 400 may include determining that the user device is to be connected on a video call (block 420). For example, network device 230 may determine that user device 210 is to be connected to emergency guidance device 240 on a video call. In some implementations, network device 230 may determine that user device 210 is to be connected on the video call by detecting that the emergency call placed by user device 210 is a video call. For example, user device 210 may place the emergency call using a video call application (e.g., Skype, FaceTime, Google Video Chat, etc.).

In some implementations, network device 230 may receive user input indicating that user device 210 is to be connected on the video call. For example, a user of user device 210 may provide user input indicating that user device 210 is to be connected on the video call. In some implementations, the user may provide user input to user device 210 via a user interface associated with user device 210. For example, the user may enter (e.g., by use of a keyboard, a touchscreen display, a microphone, etc.) information identifying a preference to connect on the video call. In some implementations, the user may provide the information via an automated voice response network, such as an interactive voice response ("IVR") system, and/or by use of a voice response unit ("VRU"). Additionally, or alternatively, the user may select an option (e.g., a button, a key, etc.) on a display associated with user device 210 to connect on the video call.

In some implementations, network device 230 may receive information input by a dispatcher associated with emergency call device 220. For example, the dispatcher may input information (e.g., by use of a keyboard, a keypad, a touchscreen display, a microphone, etc.), into a user interface associated with emergency call device 220, indicating that user device 210 is to be connected to emergency guidance device 240 on a video call. In some implementations, the dispatcher may indicate that user device 210 is to be connected on a video call based on information received from user device 210, such as emergency information, information provided by the user (e.g., the user's statements during the emergency call), or the like.

In some implementations, network device 230 may determine that user device 210 is to be connected on the video call based on the feasibility of conducting the video call. For example, network device 230 may determine whether user device 210 is capable of receiving and/or sending video (e.g., whether user device 210 includes and/or is connected to a video camera, a web camera, etc.). In some implementations, network device 230 may determine whether a network (e.g., network 250) associated with user device 210 has sufficient bandwidth to support the video call. Additionally, or alternatively, network device 230 may determine whether user device 210 has sufficient reception (e.g., signal strength) to connect on the video call.

In some implementations, network device 230 may determine whether account information (e.g., information associated with a video call application) is available that allows for a video call. For example, network device 230 may determine whether user device 210 is associated with a video call application and/or a video call username. Additionally, or alternatively, network device 230 may determine whether a user of user device 210 has provided permission to receive video calls.

As further shown in FIG. 4, process 400 may include receiving emergency information and/or user information associated with the emergency call (block 430). For example, network device 230 may receive emergency information associated with the emergency call from user device 210 and/or emergency call device 220.

The emergency information may include information identifying an emergency type. For example, the emergency information may identify whether the emergency is a medical emergency, a fire emergency, an emergency requiring police assistance, an emergency requiring animal control, or the like. Additionally, or alternatively, the emergency information may include information associated with the emergency (e.g., a description of a scene of the emergency, a description of people and/or objects involved in the emergency, a location of the emergency, a status of the emergency, a time associated with the emergency, etc.).

In some implementations, the emergency information may include information associated with user device 210. For example, the emergency information may include information identifying a device location, a device type (e.g., a mobile telephone, a computer, etc.), a device identifier (e.g., a telephone number, an internet protocol address ("IP address"), a device serial number, etc.), or the like.

The user information may include information associated with a user of user device 210, such as a name, an address, an account identifier (e.g., a number associated with a service provider account), or the like. Additionally, or alternatively, the user information may identify a characteristic of the user that may be relevant to the emergency. For example, the user information may identify a medical condition of the user (e.g., an allergy, an indication that the user is diabetic, an indication that the user has a heart condition, etc.), a gender of the user, an age of the user, a blood type of the user, or the like.

In some implementations, the emergency information and/or the user information may be requested and/or received from another device, such as a home subscriber server ("HSS"). For example, network device 230 may request a name of the user from an HSS. As another example, network device 230 may request user information, such as information identifying a medical condition of the user, from another device that stores user information (e.g., an information storage device). In some implementations, network device 230 may request the user information based on the emergency information, such as an emergency type. For example, network device 230 may request information identifying a medical condition of the user based on determining that the emergency call is associated with a medical emergency. Network device 230 may provide the emergency information and/or the user information to emergency guidance device 240, in some implementations.

In some implementations, the emergency information and/or the user information may include information input by a user associated with user device 210 and/or information stored by user device 210. For example, the user may input emergency information, such as an emergency type, into user device 210 (e.g., via a user interface). User device 210 and/or network device 230 may provide user information based on the emergency information, in some implementations. For example, user device 210 and/or network device 230 may determine a particular emergency type, such as a fire emergency, and may transmit a particular type of user information based on the emergency type (e.g., may transmit the user's address to fire personnel associated with emergency guidance device 240, but may not transmit the user's medical conditions).

Additionally, or alternatively, the emergency information and/or the user information may include information input by a dispatcher associated with emergency call device 220 (e.g., a dispatcher in an emergency call center). For example, the dispatcher may speak with the user (via a telephone call, a video call, etc.) and collect information about the emergency and/or the user. The dispatcher may input, via a user interface, the information about the emergency and/or the user into emergency call device 220. Emergency call device 220 may transmit the emergency information and/or the user information to network device 230, in some implementations.

As further shown in FIG. 4, process 400 may include identifying an emergency guidance device, based on the emergency information and/or the user information (block 440). For example, network device 230 may receive emergency information and/or user information from user device 210 and/or emergency call device 220, and may identify an emergency guidance device 240 based on the emergency information and/or the user information.

In some implementations, emergency guidance device 240 may include a device associated with emergency personnel. For example, emergency guidance device 240 may include a device (e.g., a computer, a smartphone, etc.) associated with a physician, a fire fighter, a police officer, a security guard, or the like. In some implementations, emergency guidance device 240 may include a device at an external location (e.g., a call center, a hospital, a fire station, a police station, etc.). In some implementations, emergency guidance device 240 may include a device associated with emergency personnel on route to the emergency (e.g., a device inside an ambulance, a device inside a fire truck, a device inside a police car, a cellular telephone, a smartphone, a tablet computer, etc.). Additionally, or alternatively, emergency guidance device 240 may include a device associated with emergency personnel at the scene of the emergency (e.g., a device inside an ambulance, a device inside a fire truck, a device inside a police car, a cellular telephone, a smartphone, a tablet computer, etc.).

In some implementations, emergency guidance device 240 may include a tutorial device (e.g., a computer, a server, etc.) that includes one or more video tutorials. For example, the video tutorials may include prerecorded tutorials that provide information for responding to certain types of emergencies (e.g., a tutorial on how to put out a grease fire, a tutorial on how to perform the Heimlich maneuver, a tutorial on how to perform CPR, etc.).

In some implementations, network device 230 may identify emergency guidance device 240 based on emergency information and/or user information associated with the emergency call. For example, network device 230 may receive emergency information identifying a specific emergency type (e.g., a medical emergency). Based on this information, network device 230 may identify emergency guidance device 240 (e.g., a computer, a call center, etc.) associated with emergency personnel (e.g., a physician) that matches the emergency type. In some implementations, network device 230 may store information (e.g., in a data structure associated with emergency call device 220, network device 230, emergency guidance device 240, an HSS, etc.) identifying training and/or skills associated with emergency personnel (e.g., emergency personnel trained to handle a particular medical condition). In this instance, network device 230 may use the emergency information identifying an emergency (e.g., a stroke) to search the data structure and locate emergency personnel (e.g., a physician) with relevant training (e.g., training on treating stroke victims) and/or an emergency guidance device 240 to connect on the video call. Network device 230 may provide the emergency information and/or the user information to emergency guidance device 240, in some implementations.

Additionally, or alternatively, network device 230 may identify an emergency guidance device 240 based on a location (e.g., an emergency location, a location of user device 210, a location of emergency call device 220, etc.). For example, network device 230 may receive emergency information about an emergency (e.g., a fire) at a specific location (e.g., a particular address). Based on this information, network device 230 may locate emergency guidance device 240 (e.g., a computer at a fire station) near the emergency (e.g., closest to the fire).

In some implementations, network device 230 may automatically connect user device 210 with emergency guidance device 240 on the video call. For example, network device 230 may receive emergency information and/or video call information, and may automatically connect user device 210 with emergency guidance device 240 based on the information (e.g., based on the nature of the emergency, preset indications associated with a service provider account, etc.). Additionally, or alternatively, network device 230 may connect user device 210 to emergency guidance device 240 based on user input (e.g., input received from a user of user device 210, a dispatcher associated with emergency call device 220, emergency personnel associated with emergency guidance device 240, etc.).

In some implementations, emergency call device 220 may identify emergency guidance device 240. For example, emergency call device 220 may receive the emergency information and/or video call information, and may automatically connect user device 210 with emergency guidance device 240 based on the information. Additionally, or alternatively, emergency call device 220 may receive user input and may connect user device 210 to emergency guidance device 240 based on the user input.

As further shown in FIG. 4, process 400 may include obtaining video call information associated with the user device and the emergency guidance device (block 450). For example, network device 230 may obtain video call information from user device 210, emergency guidance device 240, and/or another device that stores video call information associated with user device 210 and/or emergency guidance device 240.

In some implementations, the video call information may include information for placing a video call to user device 210 and/or emergency guidance device 240. For example, the video call information may include an identifier (e.g., a telephone number, an IP address, a serial number, a uniform resource identifier ("URI"), etc.) that identifies user device 210 and/or emergency guidance device 240. Additionally, or alternatively, the video call information may include information that identifies a bandwidth, a preferred bit rate, a program for encoding and/or decoding a signal (e.g., a codec), or the like, associated with user device 210 and/or emergency guidance device 240.

Additionally, or alternatively, the video call information may include information identifying a video call application (e.g., Skype, FaceTime, Google Video Chat, etc.) associated with user device 210 and/or emergency guidance device 240. The video call information may include account information (e.g., a username, a password, etc.) associated with the video call application. The account information may allow a device (e.g., user device 210, emergency call device 220, network device 230, emergency guidance device 240, etc.) to connect with user device 210 and/or emergency guidance device 240 on a video call. In some implementations, the video call application may be associated with an automobile, and may permit transmission of video from a camera (e.g., a rear view camera, a front view camera, etc.) associated with the automobile.

In some implementations, the video call information may be provided by a user of user device 210 and/or emergency personnel associated with emergency guidance device 240. For example, the user may input video call information into user device 210 and/or emergency personnel may input video call information into emergency guidance device 240. Network device 230 may receive the video call information from user device 210 and/or emergency guidance device 240. Additionally, or alternatively, the video call information may be provided by a dispatcher associated with emergency call device 220. For example, the dispatcher may input the video call information into emergency call device 220. In some implementations, the dispatcher may receive the video call information from the user (e.g., during the emergency call) and may enter the information into emergency call device 220. Network device 230 may receive the video call information from user device 210 and/or emergency call device 220.

In some implementations, the video call information may be provided automatically. For example, user device 210, emergency call device 220, and/or emergency guidance device 240 may automatically provide the video call information to network device 230. Additionally, or alternatively, user device 210, emergency call device 220, and/or emergency guidance device 240 may provide a portion of the video call information automatically, (e.g., a caller ID, an IP address, a device location, etc.), and a portion of the video call information based on user input (e.g., an emergency description, an emergency location, etc.).

In some implementations, the video call information may be stored by network device 230 (e.g., in a data structure). Additionally, or alternatively, network device 230 may receive the video call information from another device, such as an HSS, an application server, or the like.

As further shown in FIG. 4, process 400 may include connecting the user device to the emergency guidance device via a video call, based on the video call information (block 460). For example, network device 230 may use the video call information associated with user device 210 and the video call information associated with emergency guidance device 240 to connect user device 210 and emergency guidance device 240 on a video call.

In some implementations, network device 230 may connect user device 210 and emergency guidance device 240 by placing the video call to each device. Additionally, or alternatively, network device 230 may receive the video call from user device 210 and/or emergency call device 220, and may transmit the video call to emergency guidance device 240. In some implementations, network device 230 may send video call information (e.g., information identifying a video call application associated with user device 210, a video call username associated with user device 210, etc.) to emergency guidance device 240. Using the video call information, emergency guidance device 240 may place the video call to user device 210 (e.g., by using the video call application to place a video call to the video call username).

In some implementations, user device 210 may be associated with more than one video call application. Network device 230 may determine the video call application to be used for the video call based on a video call application associated with emergency guidance device 240. For example, network device 230 may determine that user device 210 and emergency guidance device 240 are both associated with the same video call application, and may use that video call application for the video call.

In some implementations, network device 230 may record the video call (e.g., store the video call in a data structure associated with emergency call device 220, network device 230, emergency guidance device 240, etc.). For example, network device 230 may record the video call for later use for reference, training emergency personnel, etc. Additionally, or alternatively, network device 230 may display the video call on a peripheral device (e.g., a call center computer, a smartphone associated with emergency personnel, etc.). For example, network device 230 may display the video call (e.g., provide a video feed of the video call) to one or more peripheral devices (e.g., computers at a call center) so that the video call may be viewed (e.g., by emergency personnel).

Although FIG. 4 shows example blocks of process 400, in some implementations, process 400 may include additional blocks, different blocks, fewer blocks, and/or differently arranged blocks than those depicted in FIG. 4. Additionally, or alternatively, one or more of the blocks of process 400 may be performed in parallel. Further, one or more blocks may be omitted in some implementations.

Figure 5A:
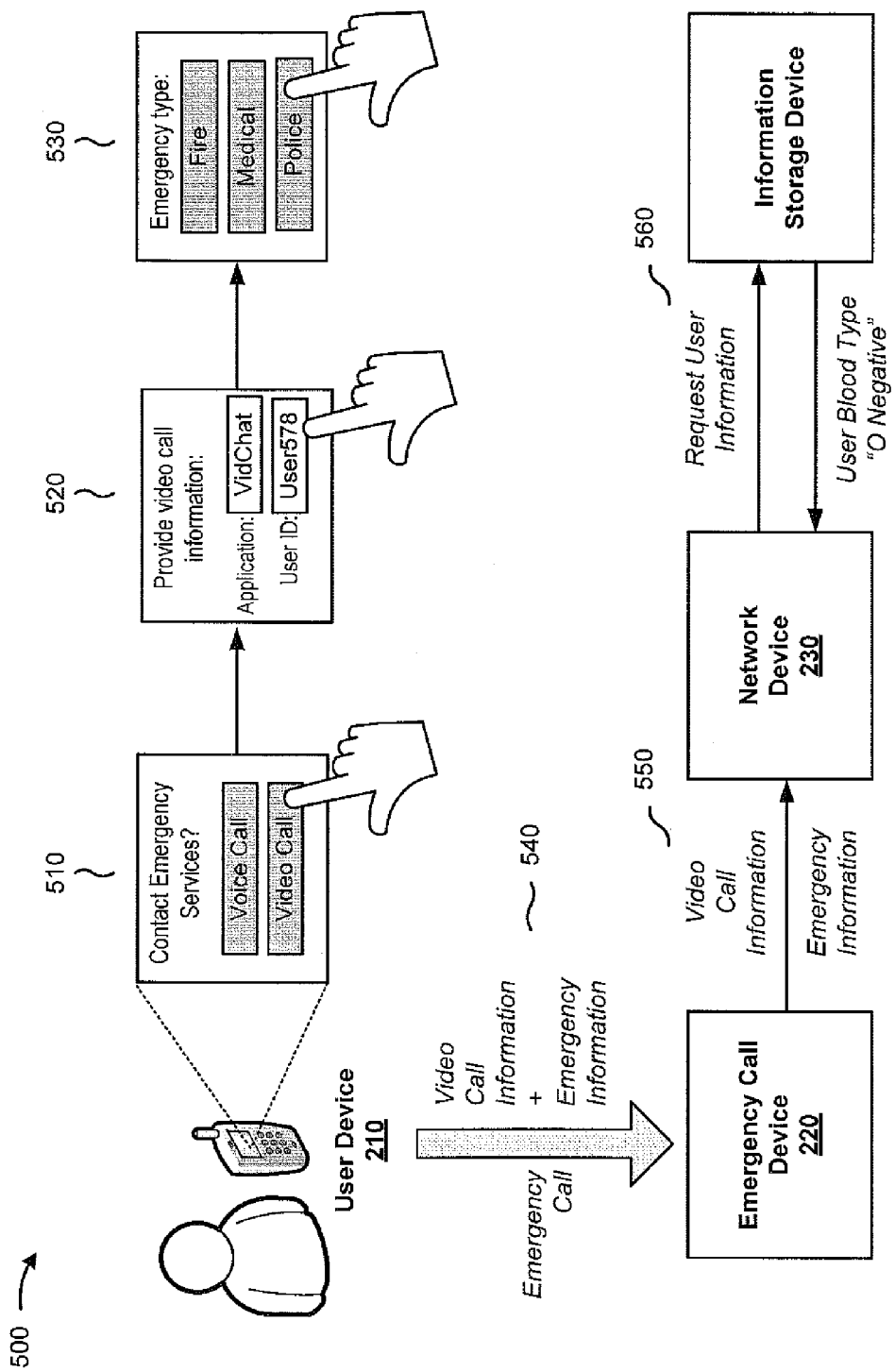
FIGS. 5A and 5B are diagrams of an example implementation relating to the example process shown in FIG. 4.
Figure 5B:
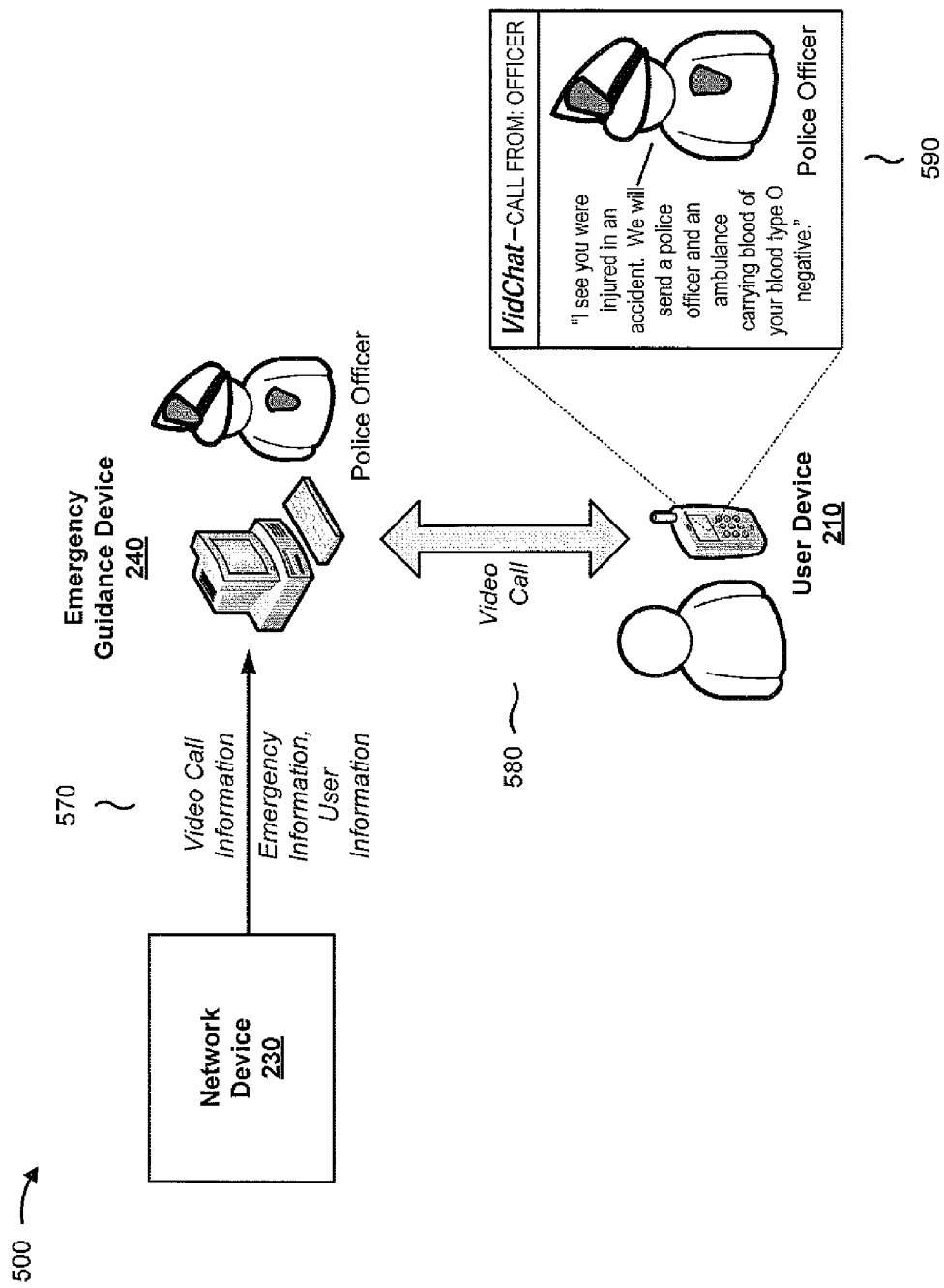

FIGS. 5A and 5B are diagrams of an example implementation 500 relating to process 400 (FIG. 4). In example implementation 500, a user of user device 210 provides emergency information and video call information that allows emergency guidance device 240 to connect with user device 210 on a video call.

As shown in FIG. 5A, network device 230 may detect an emergency call from user device 210, and may receive video call information and emergency information input by a user of user device 210 via a user interface.

As shown by reference number 510, user device 210 may include a smartphone with an application that allows user device 210 to place an emergency call. The user may input information (e.g., via a touchscreen display) indicating a preference to have the emergency call include a video call (e.g., by selecting a "Video Call" button on the display of user device 210). As shown by reference number 520, the user may input, or select, video call information that identifies a video call application (e.g., "VidChat") and a video call application identifier (e.g., "User578") to use for the video call. Alternatively, the video call information may be stored in memory and automatically used when the user selects "Video Call." As shown by reference number 530, the user may input emergency information identifying an emergency type (e.g., by selecting a "Police" button). Alternatively, the emergency information may be stored in memory and automatically used when the user selects "Video Call."

As shown by reference number 540, user device 210 may place the emergency call to emergency call device 220 (e.g., via network device 230). Emergency call device 220 may receive the video call information and the emergency information. In some implementations, a dispatcher associated with emergency call device 220 may collect additional emergency information, user information, and/or video call information, such as a description of the emergency, an emergency location, or the like. Network device 230 may receive the video call information and the emergency information from emergency call device 220, as shown by reference number 550.

As shown by reference number 560, network device 230 may request user information from an information storage device. For example, network device 230 may transmit a user device identifier, a user identifier, an emergency type identifier, or the like, to the information storage device. Based on receiving information identifying the user, the user device, and/or the type of emergency (e.g., a police emergency), user device may send user information (e.g., by searching a data structure for the user information), such as information identifying a blood type of the user as "O Negative." Additionally, or alternatively, network device 230 may request and/or receive the user information (e.g., from user device 210, from the information storage device, etc.) prior to connecting user device 210 and emergency call device 220, and may provide the user information to emergency call device 220.

As shown in FIG. 5B, network device 230 or emergency call device 220 may use the emergency information to identify one or more emergency guidance devices 240 appropriate for the emergency, which may place a video call to user device 210 using the video call information.

As shown by reference number 570, network device 230 may identify emergency guidance device 240 based on the emergency information. For example, network device 230 may use the emergency location and the emergency type to identify emergency guidance device 240 (e.g., a computer associated with a police officer at a police station near the emergency). Network device 230 may send the video call information (e.g., the video call application, the application identifier, etc.), the emergency information, and the user information to emergency guidance device 240.

As shown by reference number 580, emergency guidance device 240 may use the video call information to connect to user device 210 on a video call. For example, emergency guidance device 240 may use the video calling application (e.g., "VidChat") to place the video call to user device 210 (e.g., via network device 230). Emergency guidance device 240 may use the video call application username (e.g., "User578") to identify the user, and may place the video call to user device 210 based on the video call application user name (e.g., by placing the video call to "User578").

As shown by reference number 590, user device 210 may display the video call on a display associated with user device 210. The video call may also be displayed on a display associated with emergency guidance device 240. The display of emergency guidance device 240 may display the user information (e.g., blood type "O negative") to permit emergency personnel to respond appropriately. User device 210 may display video of emergency personnel (e.g., the police officer) associated with emergency guidance device 240. The user may receive instructions from emergency personnel, and emergency personnel may be able to perceive the user and/or the user's surroundings (e.g., the scene of the emergency).

As indicated above, FIG. 5 is provided merely as an example. Other examples are possible and may differ from what is described with regard to FIG. 5.

Figure 6:
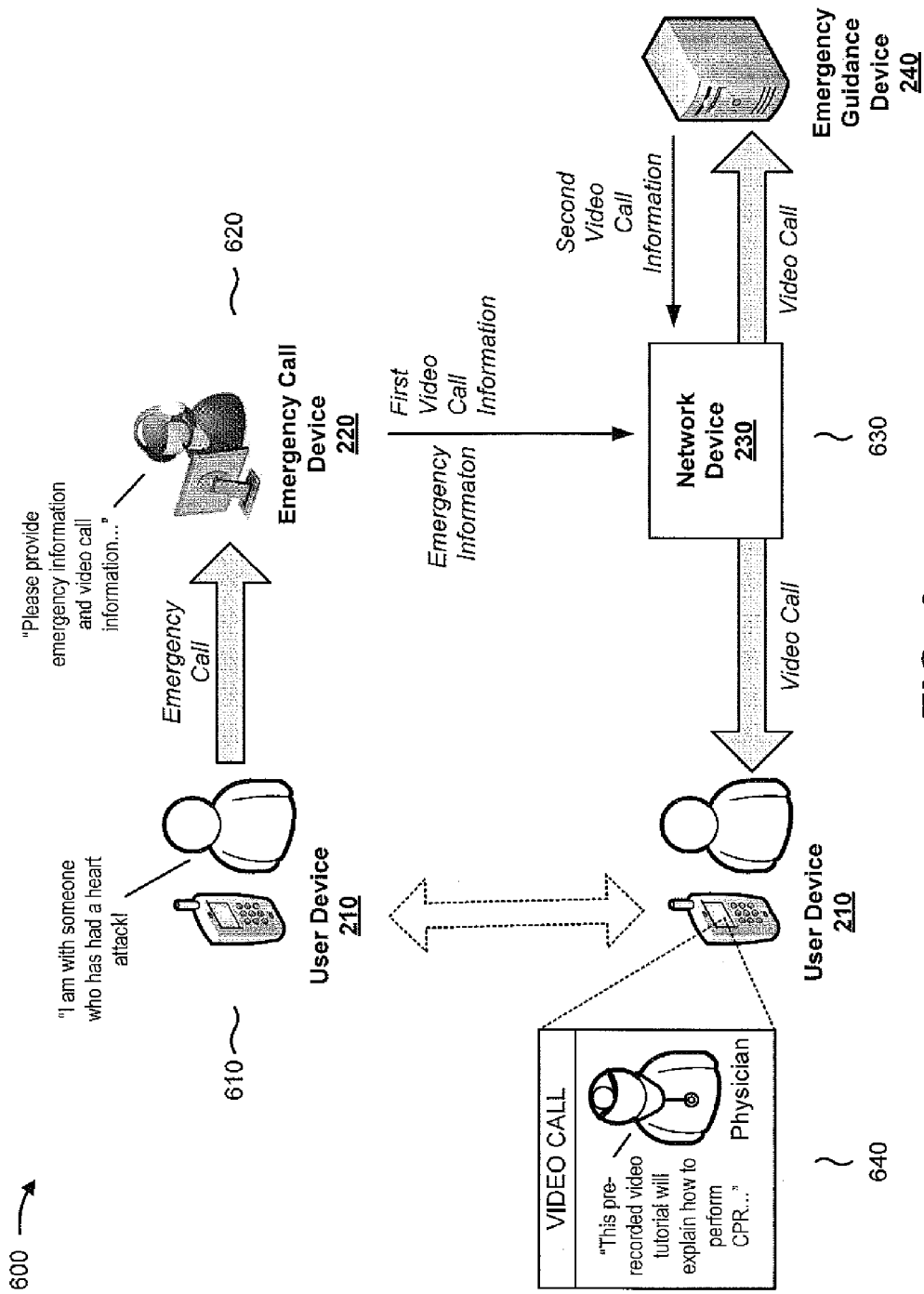
FIG. 6 is a diagram of another example implementation relating to the example process shown in FIG. 4.

FIG. 6 is a diagram of another example implementation 600 relating to process 400 shown in FIG. 4. In example implementation 600, network device 230 may connect user device on a video call with emergency guidance device 240, which may provide a pre-recorded video tutorial to assist with the emergency.

As shown by reference number 610, user device 210 (e.g., a smartphone) may place an emergency call, to emergency call device 220, regarding an emergency (e.g., a heart attack suffered by a victim). Emergency call device 220 (e.g., a computer in a call center) may connect with user device 210 on the emergency call, as shown by reference number 620. A dispatcher (e.g., a call center employee) associated with emergency call device 220 may collect emergency information (e.g., that the emergency includes a heart attack) and first video call information (e.g., information identifying a video call application and a video call username associated with user device 210) from a user of user device 210. The dispatcher may request an ambulance to come to the scene of the emergency.

As shown by reference number 630, network device 230 may receive the emergency information and the first video call information from emergency call device 220. Based on the emergency information (e.g., that the emergency includes a heart attack), network device 230 may identify emergency guidance device 240 (e.g., a server with a prerecorded video tutorial explaining how to perform CPR). Network device 230 may receive second video call information (e.g., an IP address) from emergency guidance device 240. Based on the first video call information (e.g., the video call application and the video call username associated with user device 210) and the second video call information (e.g., the IP address), network device 230 may connect user device 210 and emergency guidance device 240.

As shown by reference number 640, user device 210 may receive (e.g., via the video call) the prerecorded video tutorial on performing CPR. The video may be displayed on user device 210 (e.g., on a screen associated with user device 210). Thus, the user may receive instructions on how to perform CPR while waiting for emergency personnel (e.g., the ambulance) to arrive at the scene of the emergency.

As indicated above, FIG. 6 is provided merely as an example. Other examples are possible and may differ from what is described with regard to FIG. 6.

FIG. 7 is a flow chart of an example process 700 for aggregating video calls associated with an emergency. In some implementations, one or more process blocks of FIG. 7 may be performed by network device 230. Additionally, or alternatively, one or more process blocks of FIG. 7 may be performed by user device 210, emergency call device 220, and/or emergency guidance device 240.

As shown in FIG. 7, process 700 may include detecting a first emergency call from a first user device associated with a first emergency, and a second emergency call from a second user device associated with a second emergency (block 710). For example, network device 230 may detect the first emergency call from the first user device 210 associated with the first emergency, and the second emergency call from the second user device 210 associated with the second emergency.

In some implementations, network device 230 may receive the emergency call directed to emergency call device 220. For example, network device 230 may receive the emergency call from user device 210, and may transmit (e.g., connect) the emergency call to emergency call device 220. Additionally, or alternatively, network device 230 may receive a notification of the emergency call from user device 210 and/or emergency call device 220. For example, user device 210 may place the emergency call to emergency call device 220, and network device 230 may receive a notification (e.g., from user device 210 and/or emergency call device 220) that the emergency call has been placed.

As further shown in FIG. 7, process 700 may include determining that the first user device and the second user device are to be connected on a video call with an emergency guidance device (block 720). For example, network device 230 may determine that the first user device 210 and the second user device 210 are to be connected to emergency guidance device 240 on a video call. In some implementations, network device 230 may determine that the first user device 210 and the second user device 210 are to be connected on a video call with emergency guidance device 240 before connecting the first user device 210 and the second user device 210 on the video call. Additionally, or alternatively, network device 230 may connect the first user device 210 to a first emergency guidance device 240, and may connect the second user device 210 to a second emergency guidance device 240. In this instance, network device 230 may determine that the first and second user device 210 are to be connected on the video call, and may determine an emergency guidance device 240 (e.g., the first emergency guidance device 240, the second emergency guidance device 240, a third emergency guidance device 240, etc.) to connect to the first and second user devices 210 (e.g., by transferring the video calls, by connecting the first and second emergency guidance devices, etc.).

In some implementations, network device 230 may receive user input indicating that user devices 210 are to be connected on the video call. For example, a first user associated with the first user device 210, and/or a second user associated with the second user device 210, may provide user input (e.g., via a user interface) indicating that user devices 210 are to be connected on the video call. Additionally, or alternatively, network device 230 may receive information input by a dispatcher associated with one or more emergency call devices 220 (e.g., a first emergency call device 220 associated with the first user device 210, a second emergency call device 220 associated with the second user device 210, etc.). For example, the dispatcher (e.g., the dispatcher or dispatchers associated with the first and/or second emergency call devices 220) may input information received from the users of user devices 210 (e.g., via the first and second emergency calls) indicating that user devices 210 are to be connected on the video call.

In some implementations, network device 230 may determine that user devices 210 and emergency guidance device 240 are to be connected on the video call based on the feasibility of conducting the video call (e.g., based on whether user devices 210 have video call capability, whether one or more networks associated with user devices 210 and/or emergency guidance device 240 has sufficient bandwidth, etc.). Additionally, or alternatively, network device 230 may determine that user devices 210 and emergency guidance device 240 are to be connected on the video call based on account information associated with user devices 210 (e.g., information identifying a video call application, information indicating whether the users of user devices 210 have provided permission to connect on a video call, etc.).

As further shown in FIG. 7, process 700 may include receiving emergency information associated with the first and/or second emergency calls (block 730). For example, network device 230 may receive emergency information associated with the first user device 210 and/or the second user device 210.

In some implementations, the emergency information may include information identifying an emergency type (e.g., a medical emergency, a fire emergency, a police emergency, etc.) of the first and/or second emergency, a description of a scene of the first and/or second emergency, a location of the first and/or second emergency, a description of people and/or objects involved in the first and/or second emergency, a status of the first and/or second emergency, a time associated with the first and/or second emergency call (e.g., a time that the first and/or second emergency call was placed or received), or the like. Additionally, or alternatively, emergency information may include information associated with user devices 210, such as a device location, a device type, a device identifier (e.g., a telephone number, an IP address, a device serial number, etc.), user account information associated with users of user devices 210 (e.g., a user name, a user address, a user account number, etc.).

As further shown in FIG. 7, process 700 may include determining that the first emergency and the second emergency are the same (block 740). For example, network device 230 may determine that the first user device 210 and the second user device 210 are placing emergency calls regarding the same emergency.

In some implementations, network device 230 may determine that the first emergency and the second emergency are the same based on emergency information. For example, network device 230 may receive first emergency information associated with the first emergency call, and second emergency information associated with the second emergency call. Network device 230 may determine that the first emergency and the second emergency are the same based on detecting that a portion of the first emergency information matches a portion of the second emergency information.

In some implementations, network device 230 may detect a matching emergency location associated with the first and second emergencies. For example, network device 230 may detect that the first and second emergency calls identify a first and second emergency at the same location (e.g., the same address, the same street intersection, the same global positioning satellite ("GPS") location, etc.). Additionally, or alternatively, network device 230 may detect that the first user device 210 and the second user device 210 are within a threshold distance (e.g., within one hundred feet) of each other when the first and second emergency calls are placed.

In some implementations, network device 230 may detect a matching emergency type associated with the first and second emergencies. For example, network device 230 may detect that the first and second emergency calls identify the same emergency type (e.g., a medical emergency, a fire emergency, a police emergency, etc.). Additionally, or alternatively, network device 230 may detect matching emergency call times associated with the first and second emergency calls. For example, network device 230 may detect that the first emergency call occurred (e.g., was placed by user device 210 or received by network device 230 and/or emergency call device 220) within a threshold period of time (e.g., within three minutes) of the second emergency call.

In some implementations, network device 230 may determine that the first emergency and the second emergency are the same based on matching emergency descriptions. For example, a first user of the first user device 210 may provide a first emergency description (e.g., a description of the location, scene, objects, etc. associated with the first emergency), and a second user of the second user device 210 may provide a second emergency description (e.g., a description of the location, scene, objects, etc. associated with the second emergency). Network device 230 may determine that the first emergency description and the second emergency description are similar. In some implementations, the first and second emergency descriptions may be received by emergency call device 220 (e.g., the first user and the second user may describe the first and second emergencies to dispatchers associated with emergency call devices 220). Additionally, or alternatively, the users may provide the first and second emergency descriptions by inputting information into user devices 210. Network device 230 may receive the first and second emergency descriptions from user devices 210 and/or emergency call device 220.

In some implementations, network device 230 may use a single emergency information attribute (e.g., an emergency location) to determine that the first emergency and the second emergency are the same. Additionally, or alternatively, network device 230 may use two or more emergency information attributes to determine that the first emergency and the second emergency are the same (e.g., that emergency information associated with the first and second user devices 210 includes matching emergency locations, matching emergency types, matching emergency descriptions, etc.).

As further shown in FIG. 7, process 700 may include identifying an emergency guidance device, based on the emergency information (block 750). For example, network device 230 may receive emergency information from user devices 210 and/or emergency call device 220, and may identify emergency guidance device 240 based on the emergency information.

In some implementations, emergency guidance device 240 may include a device (e.g., a computer, a smartphone, etc.) associated with emergency personnel (e.g., medical personnel, fire personnel, police personnel, emergency call dispatchers, etc.) at the scene of the first and/or second emergency, en route to the first and/or second emergency, and/or at an external location (e.g., a call center, a hospital, a fire station, a police station, etc.).

In some implementations, network device 230 may identify emergency guidance device 240 based on emergency information (e.g., type, location, etc.). For example, network device 230 may receive emergency information identifying an emergency (e.g., a traffic collision) at a particular location (e.g., an intersection), and may locate emergency guidance device 240 (e.g., a hospital) near the emergency (e.g., close to the intersection). Additionally, or alternatively, network device 230 may identify emergency guidance device 240 based on input received from user devices 210 and/or emergency call device 220. For example, one or more users and/or dispatchers may input information identifying emergency guidance device 240, and network device 230 may receive the input. Additionally, or alternatively, the emergency information may be stored on user device 210 and/or emergency call device 220, and may be provided to network device 230 automatically.

In some implementations, network device 230 may identify multiple emergency guidance devices 240, based on the emergency information. For example, network device 230 may use the emergency information (e.g., information identifying a fire) to identify several emergency guidance devices 240 (e.g., a computer associated with a physician at a hospital, a computer associated with a fire truck traveling to the fire, a smartphone associated with a police officer near the fire, etc.). In some implementations, network device 230 may connect user devices 210 to emergency guidance devices 240 on a video conference call.

As further shown in FIG. 7, process 700 may include obtaining video call information associated with the first user device, the second user device, and the emergency guidance device (block 760). For example, network device 230 may obtain video information associated with user devices 210 and emergency guidance device 240.

In some implementations, the video call information may include a device identifier (e.g., a telephone number, an IP address, a serial number, etc.), account information (e.g., a username and/or password associated with a video call application), or the like, that allows a device (e.g., user devices 210, emergency call device 220, network device 230, voice guidance device 240, etc.) to connect on a video call. In some implementations, the video call information may be provided by one or more users associated with user devices 210, a dispatcher associated with emergency call device 220, and/or emergency personnel associated with emergency guidance device 240. In some implementations, the video call information may be stored in user device 210 prior to an emergency event, and recalled automatically by user device 210, or recalled through user input. Network device 230 may receive the input information from user devices 210, emergency call device 220, and/or emergency guidance device 240. Additionally, or alternatively, network device 230 may receive video call information stored (e.g., in a data structure) in another device, such as an HSS, an application server, or the like.

As further shown in FIG. 7, process 700 may include connecting the first and second user devices to the emergency guidance device via a video call, based on the video call information (block 770). For example, network device 230 may use the video call information to connect user devices 210 to emergency guidance device 240 on a video call. Additionally, or alternatively, network device 230 may send the video call information to emergency guidance device 240, and emergency guidance device 240 may use the video call information to place a video call (e.g., a video conference call) to user devices 210.

In some implementations, network device 230 may determine a video call application to use for the video call. For example, network device 230 may determine that all user devices 210 have a particular type of video call application, and may use the particular type of video application to connect user devices 210 on the video call. Additionally, or alternatively, network device 230 may determine that a majority of user devices 210 have a particular video call application, and may use the particular video call application for the video call. In some implementations, network device 230 may use a video call application associated with the greatest number of user devices 210. Additionally, or alternatively, network device 230 may determine the video call application based on a video call application associated with emergency guidance device 240. In some implementations, network device 230 may determine that user device 210 is not associated with the video call application, and may connect user device 210 on the video call by voice only (e.g., may connect user device 210 on the video call with only voice capability).

Although FIG. 7 shows example blocks of process 700, in some implementations, process 700 may include additional blocks, different blocks, fewer blocks, and/or differently arranged blocks than those depicted in FIG. 7. Additionally, or alternatively, one or more of the blocks of process 700 may be performed in parallel. Further, one or more blocks may be omitted in some implementations.

Figure 8A:
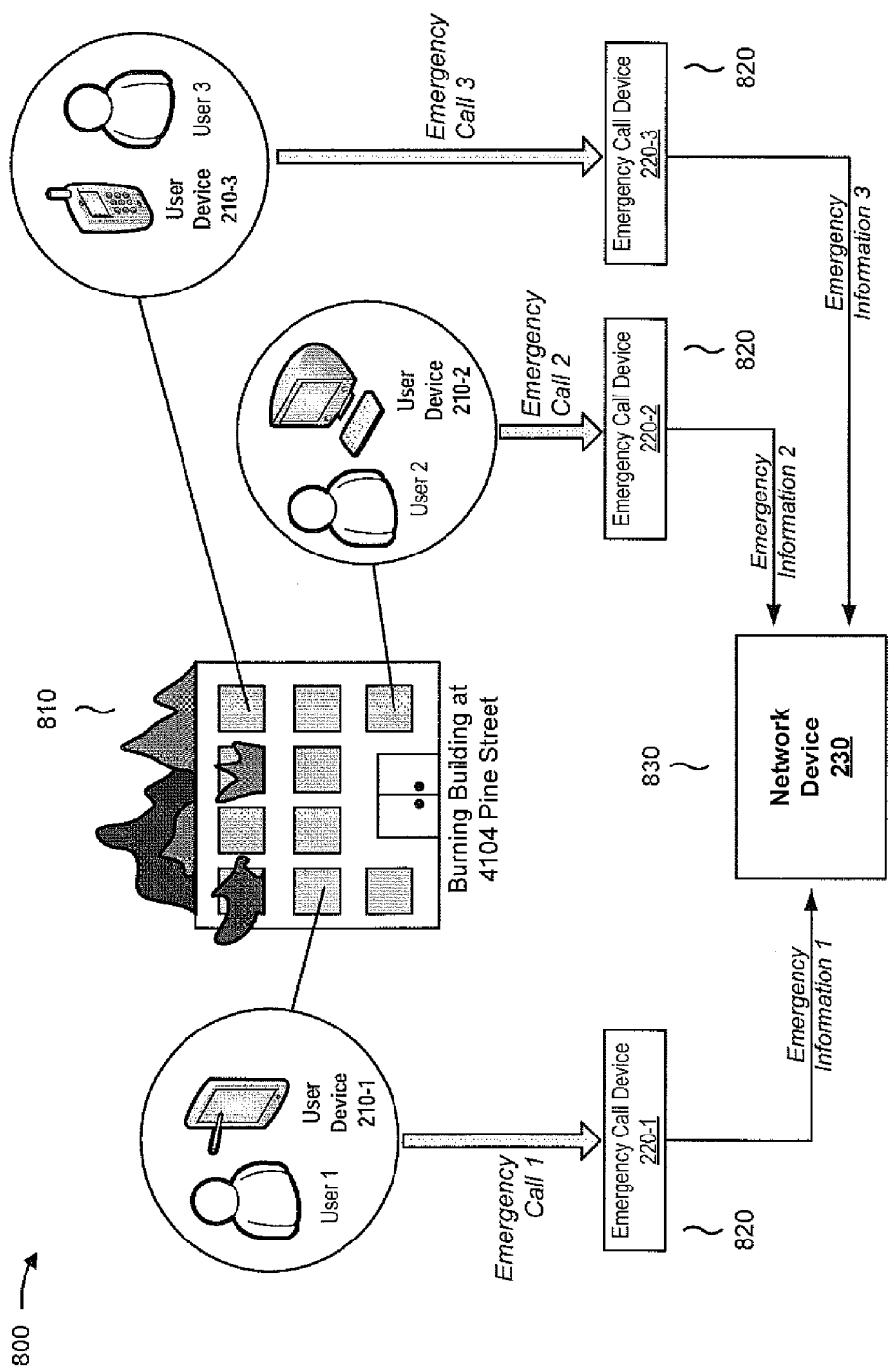
FIGS. 8A and 8B are diagrams of an example implementation relating to the example process shown in FIG. 7.
Figure 8B:
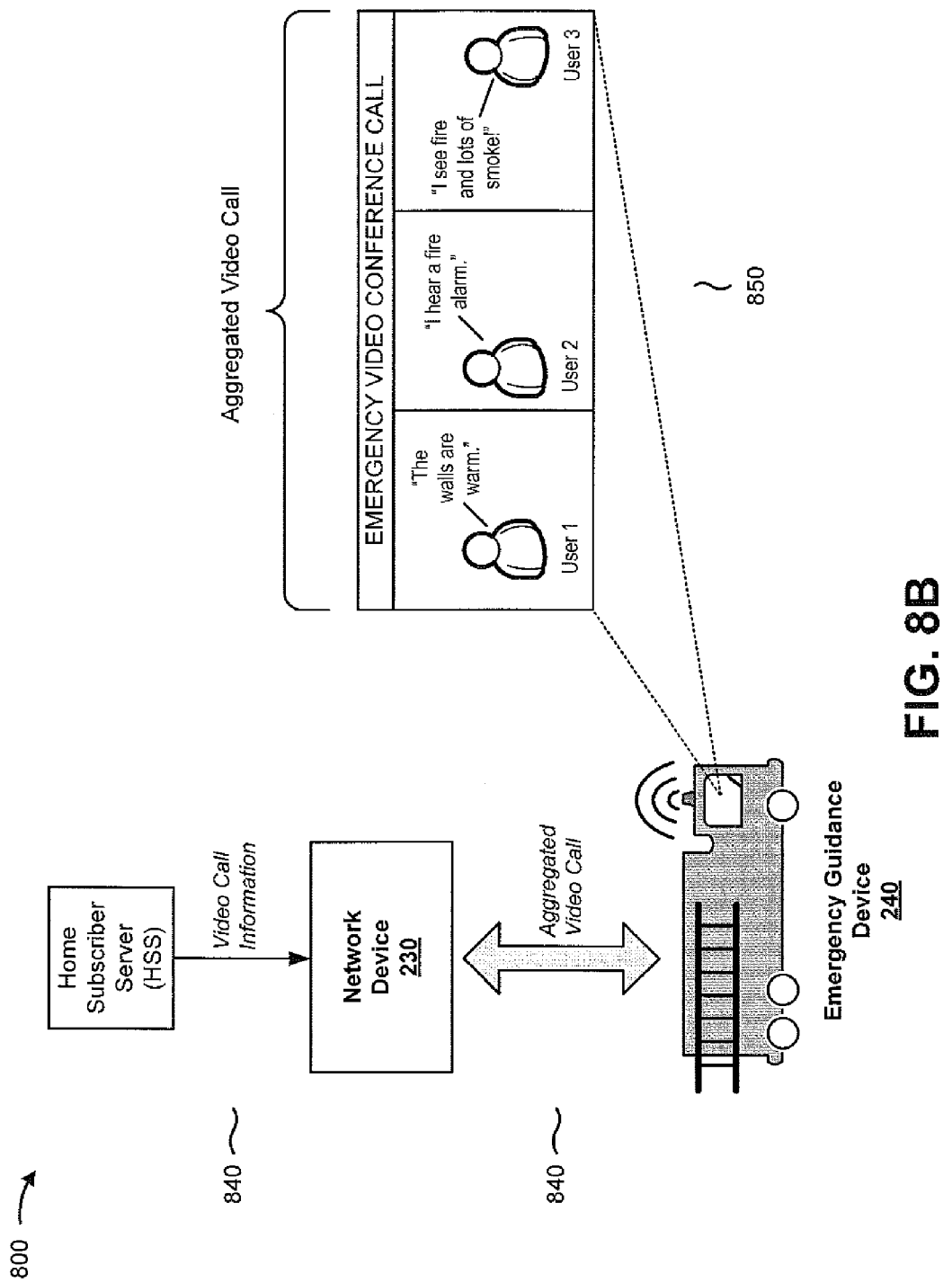

FIGS. 8A and 8B are diagrams of an example implementation 800 relating to process 700 shown in FIG. 7. In example implementation 800, network device 230 may detect multiple emergency calls from multiple user devices 210, and may connect user devices 210 to emergency guidance device 240 on a video call.

As shown in FIG. 8A, network device 230 may detect three emergency calls from three user devices 210 associated with a single emergency.

As shown by reference number 810, a first user (e.g., "User 1") associated with a first user device 210-1 (e.g., a tablet computer), a second user (e.g., "User 2") associated with a second user device 210-2 (e.g., a desktop computer), and a third user (e.g., "User 3") associated with a third user device 210-3 (e.g., a smartphone) may be residents of a burning building (e.g., located at "4104 Pine Street"). At different times, the users may place emergency calls (e.g., "Emergency Call 1," "Emergency Call 2," and "Emergency Call 3") to three emergency call devices 220 (e.g., emergency call device 220-1, emergency call device 220-2, and emergency call device 220-3), as shown by reference number 820. In some implementations, one or more dispatchers associated with one or more emergency call devices 220 may collect emergency information associated with the emergency calls. For example, the one or more dispatchers may collect an emergency type (e.g., a fire emergency) and an emergency location (e.g., "4104 Pine Street") from the users (e.g., via a voice call). The one or more dispatchers may enter the emergency information (e.g., via a keyboard, a keypad, a touchscreen display, etc.) into emergency call devices 220.

As shown by reference number 830, network device 230 may detect the emergency calls (e.g., "Emergency Call 1," "Emergency Call 2," and "Emergency Call 3"), and may receive the emergency information (e.g., "Emergency Information 1," "Emergency Information 2," and "Emergency Information 3") from emergency call devices 220. Based on the emergency information, network device 230 may determine that the first emergency, the second emergency, and the third emergency are the same emergency. For example, network device 230 may determine that the description (e.g., a description of a burning building) and the location (e.g., "4104 Pine Street") reported by the first user (e.g., "User 1") matched the description and location reported by the second user (e.g., "User 2") and the third user (e.g., "User 3 "). By detecting that the users have reported the same emergency type at the same location, network device 230 may determine that user devices 210 are associated with a single emergency. Based on the emergency information (e.g., the emergency type and the emergency location), network device 230 may determine emergency guidance device 240 (e.g., a computing device associated with a fire truck traveling to the burning building).

As shown in FIG. 8B, network device 230 may connect user devices 210 to emergency guidance device 240 on a video call.

As shown by reference number 840, network device 230 may receive video call information from a home subscriber server ("HSS"). The HSS may store account information associated with user devices 210, such as information identifying a preferred video call application, a username associated with the video call application, and/or a user preference to connect on the video call. Based on the video call information (e.g., based on the users' preference to connect on a video call), network device 230 may determine that user devices 210 may be connected to emergency guidance device 240 on the video call. Because user devices 210 are associated with the same emergency (e.g., the burning building), network device 230 may determine to aggregate the video calls (e.g., to connect user devices 210 to emergency guidance device 240 on a video conference call). Based on the video call information (e.g., based on the video call applications and usernames) associated with user devices 210, network device 230 may connect user devices 210 to emergency guidance device 240 on a video conference call.

As shown by reference number 850, emergency guidance device 240 may communicate with the users on the aggregated video call. A display (e.g., a computer display) associated with emergency guidance device 240 may display video received from user devices 210. Emergency personnel (e.g., firefighters) associated with emergency guidance device 240 may use the aggregated video call to speak with the users, and to see the scene of the emergency.

As indicated above, FIGS. 8A and 8B are provided merely as an example. Other examples are possible and may differ from what is described with regard to FIGS. 8A and 8B.

Figure 9:
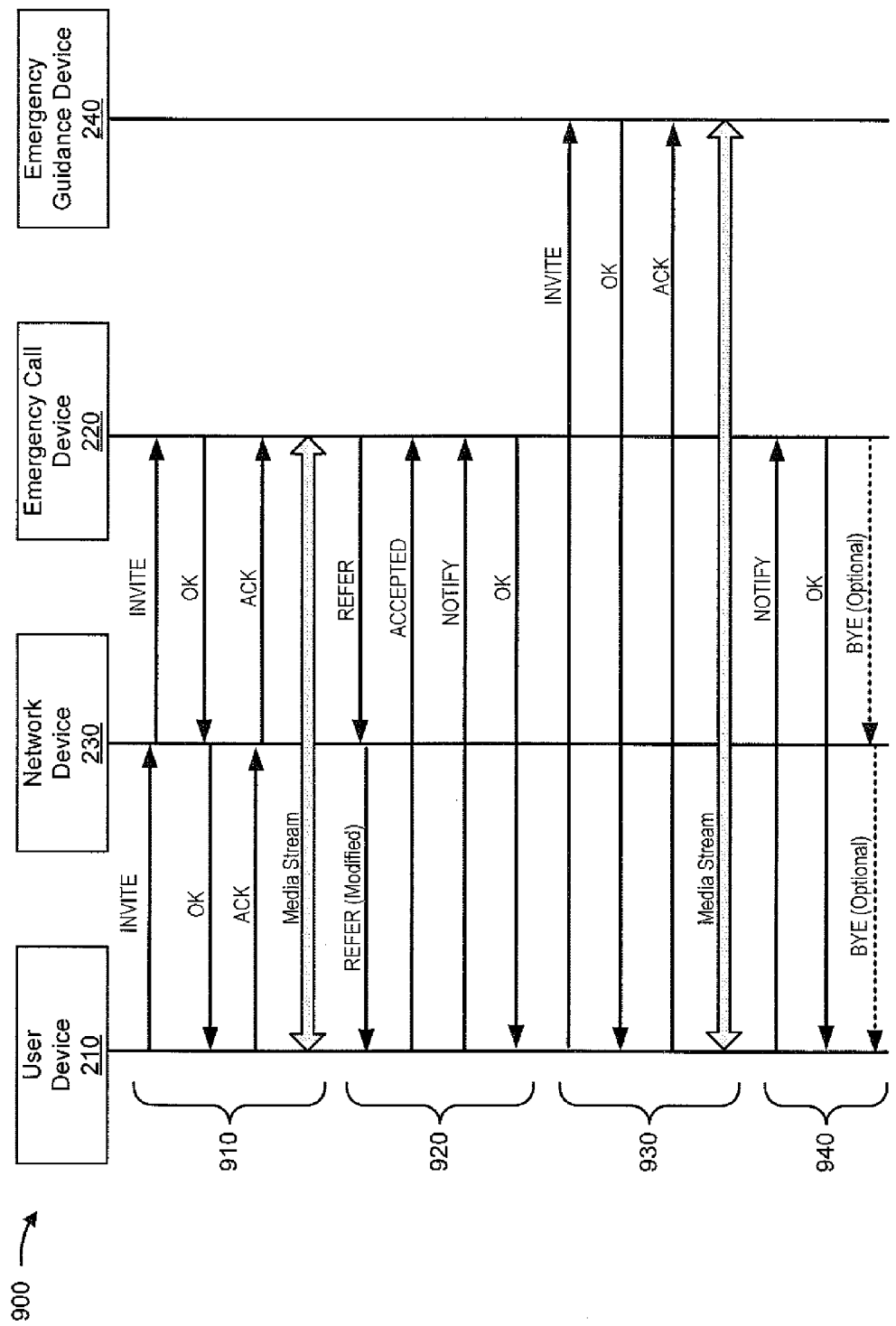
FIG. 9 is a diagram of an example call flow for establishing a video call between a user device and an emergency guidance device.

FIG. 9 is a diagram of an example call flow 900 for establishing a video call between a user device and an emergency guidance device. Network device 230 may use session initiation protocol ("SIP") (e.g., as described in the Internet Engineering Task Force (IETF) Request for Comments (RFC) 3261) to create, modify, and/or terminate two party and/or multiparty communication sessions (e.g., telephone calls, video conferencing, multimedia streaming, etc.) between user device 210, emergency call device 220, and/or emergency guidance device 240.

As shown by reference number 910, call flow 900 may include establishing a call between user device 210 and emergency call device 220. User device 210 may initiate the call between user device 210 and emergency call device 220 by sending a SIP INVITE message to network device 230. In some implementations, the SIP INVITE message may include location information (e.g., using Presence Information Data Format (PIDF), as described in IETF RFC 4119). In some implementations, the SIP INVITE message may include a session description protocol ("SDP") message (e.g., as described in IETF RFC 3264 and 4566). The SDP message may include information associated with user device 210, such as information that identifies a bandwidth, a codec (e.g., an indication about how information provided by user device 210 is to be encoded), a preferred bitrate, or the like. Additionally, or alternatively, the SIP INVITE message may include user information, emergency information (e.g., information identifying an emergency type), or the like. Based on the SDP message, network device 230 may determine an emergency call device 220, of a set of emergency call devices 220, to send the SIP INVITE message. For example, network device 230 may determine emergency call device 220 based on an emergency type, a location of user device 210, a location of emergency call device 220, a user preference, user information, an amount of bandwidth available to user device 210, or the like. Additionally, or alternatively, user device 210 may send the SIP INVITE message directly to emergency call device 220.

Emergency call device 220 may respond to the SIP INVITE message by sending a SIP OK message (e.g., a 200 OK message). In some implementations, the SIP OK message may include an SDP message (e.g., a message including information corresponding to the received SDP message, such as information identifying communication capabilities and/or preferences associated with emergency call device 220). In some implementations, emergency call device 220 may send the SIP OK message to network device 230, and network device 230 may forward the SIP OK message to user device 210. Additionally, or alternatively, emergency call device 220 may send the SIP OK message to user device 210. User device 210 may confirm receipt of a response to the SIP INVITE message (e.g., confirm receipt of the SIP OK message) by sending a SIP ACK (e.g., acknowledgement) message. Based on receiving the SIP ACK message, emergency call device 220 and user device 210, having exchanged communication parameters via SDP messages and having been informed of one another's network addresses, may establish a media stream. The media stream may include a voice call, a video call, or the like. In some implementations, the media stream may include a real-time transport protocol ("RTP") stream (e.g., as described in IETF RFC 3550). Additionally, or alternatively, the media stream may be associated with a compression and/or encoding scheme, such as an adaptive multi-rate ("AMR") audio codec, the International Telecommunication Union Telecommunication Standardization Sector (ITU-T) G.711 recommendation, the ITU-T G.729 recommendation, or the like.

As shown by reference number 920, call flow 900 may include referring user device 210 to emergency guidance device 240. For example, a user associated with emergency call device 220 (e.g., an emergency dispatcher) may determine that user device 210 and emergency guidance device 240 are to be connected on a call (e.g., a video call). Emergency call device 220 may send a SIP REFER message to network device 230 indicating that user device 210 is to initiate a call session with emergency guidance device 240. The SIP REFER message may identify emergency call device 240 by use of an identifier (e.g., an ID number, a network address, etc.). For example, the SIP REFER message may include an internet protocol ("IP") address associated with emergency guidance device 240, a uniform resource identifier ("URI") associated with emergency guidance device 240, or the like.

In some implementations, network device 230 may determine an emergency guidance device 240, of a set of emergency guidance devices 240, based on emergency information and/or user information. Network device 230 may modify the SIP REFER message based on determining emergency guidance device 240. For example, network device 230 may determine emergency guidance device 240 (e.g., based on the bandwidth of user device 210, based on the location of user device 210, etc.), and may modify the SIP REFER message so that the SIP REFER message indicates which emergency guidance device 240, of the set of emergency guidance devices 240, user device 210 is to call (e.g., network device 230 may modify the SIP REFER message to include an identifier (e.g., a network address, a URI, etc.) that identifies emergency guidance device 240).

In some implementations, user device 210 may indicate that user device 210 has accepted the SIP REFER message by sending a SIP ACCEPTED message (e.g., 202 ACCEPTED) to emergency call device 220. User device 210 may update emergency call device 220 (e.g., as to a status of an attempt to connect to emergency guidance device 240) by sending a SIP NOTIFY message to emergency call device 220, and may receive a SIP OK message from emergency call device 220 in response to the SIP NOTIFY message.

As shown by reference number 930, call flow 900 may include establishing a video call between user device 210 and emergency guidance device 240. For example, user device 210 may send a SIP INVITE message to emergency guidance device 240. User device 210 may send the SIP INVITE message based on the identifier (e.g., the network address, the URI, etc.) that identifies emergency guidance device 240. In some implementations, the SIP INVITE message may include an SDP message. Emergency guidance device 240 may send a SIP OK message (e.g., a 200 OK message) to user device 210, and user device 210 may send a SIP ACK message to emergency guidance device 240. Based on the SIP INVITE message, the SIP OK message, and the SIP ACK message, user device 210 and emergency guidance device 240 may establish a media stream. The media stream may include a video call.

As shown by reference number 940, call flow 900 may include notifying emergency call device 220 that user device 210 and emergency guidance device 240 have established a video call. For example, user device 210 may send a SIP NOTIFY message to emergency call device 220. The SIP NOTIFY message may indicate that user device 210 and emergency guidance device 240 are connected on a video call. Emergency call device 220 may send a SIP OK message acknowledging receipt of the SIP NOTIFY message.

In some implementations, user device 210 may communicate via a media stream between user device 210 and emergency call device 220 (e.g., a voice call to an emergency dispatcher). Additionally, or alternatively, user device 210 may communicate via a media stream between user device 210 and emergency guidance device 240 (e.g., a video tutorial, a video call, a voice call, etc.).

In some implementations, user device 210 may perform media mixing to allow emergency call device 220 and/or emergency guidance device 240 to receive information associated with multiple media streams. For example, user device 210 may replicate the media stream between user device 210 and emergency guidance device 240, and may provide the replicated media stream to emergency call device 220 (e.g., via a unicast message). In this manner, a user of emergency call device 220 (e.g., an emergency dispatcher) may hear and/or view the call between user device 210 and emergency guidance device 240. Additionally, or alternatively, emergency call device 220 may end the media stream between user device 210 and emergency call device 220 by sending a SIP BYE message to user device 210. In this manner, the media stream between user device 210 and emergency guidance device 240 may continue until emergency response personnel arrive at the scene of the emergency.

As indicated above, FIG. 9 is provided merely as an example. Other examples are possible and may differ from what was described with regard to FIG. 9.

Implementations described herein may allow one or more user devices to connect to an emergency guidance device via a video call. One or more users of the user devices may receive instructions from emergency personnel on how to address the emergency, and emergency personnel may have an opportunity to visually assess people, objects, and/or places associated with the emergency.

Certain implementations have been discussed herein with respect to video calls. However, in some implementations, one or more user devices may be connected to one or more emergency guidance devices on a voice call.

The foregoing disclosure provides illustration and description, but is not intended to be exhaustive or to limit the implementations to the precise form disclosed. Modifications and variations are possible in light of the above disclosure or may be acquired from practice of the implementations.

Certain implementations have been discussed herein with respect to receiving and/or transmitting information. As used herein, a device may receive information by accessing the information stored on a data structure associated with the device. Additionally, or alternatively, a device may transmit information by storing the information on a data structure associated with the device.

As used herein, the term "component" is intended to be broadly construed as hardware, firmware, or a combination of hardware and software.

Certain user interfaces have been described herein. In some implementations, the user interfaces may be customizable by a device. Additionally, or alternatively, the user interfaces may be pre-configured to a standard configuration, a specific configuration based on capabilities and/or specifications associated with a device on which the user interfaces are displayed, or a set of configurations based on capabilities and/or specifications associated with a device on which the user interfaces are displayed.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more times, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
  one or more memories; and
  one or more processors, connected to the one or more memories, to:
    identify a first emergency call from a first user device;
    receive information that identifies that the first user device is to be connected on a video call;
    obtain first video call information associated with the first user device,
      the first video call information including information that permits the video call to be established;
    receive first emergency information associated with the first emergency call;
    identify, based on the first emergency information, an emergency guidance device to which the first user device is to be connected via the video call;
    obtain second video call information associated with the emergency guidance device,
      the second video call information including information that permits the video call to be established;
    identify a second emergency call from a second user device;
    obtain third video call information associated with the second user device,
      the third video call information including information that permits the video call to be established;
    receive second emergency information associated with the second emergency call;
    determine that at least a portion of the first emergency information matches at least a portion of the second emergency information; and
    provide information to connect the first user device and the second user device on the video call with the emergency guidance device based on determining that at least a portion of the first emergency information matches at least a portion of the second emergency information,
      the information to connect being based on the first video call information, the second video call information, and the third video call information,
      the video call being a video conference call between the first user device, the second user device, and the emergency guidance device.

2. The device of claim 1, where the one or more processors, when determining that the first user device is to be connected on the video call, are further to:
  determine that the first user device is to be connected on the video call based on at least one of:
    a user preference associated with the first user device;
    a device type of the first user device;
    an amount of network bandwidth associated with the first user device;
    a location of the first user device;
    a type of emergency associated with the first user device; or
    a signal strength associated with the first user device.

3. The device of claim 1, where the one or more processors, when identifying the emergency guidance device, are further to:
  identify the emergency guidance device based on at least one of:
    an emergency type associated with the emergency call;
    an emergency location associated with the emergency call;
    an emergency type associated with the emergency guidance device;
    a device type of the emergency guidance device;
    user information associated with the first user device;
    a location of the first user device; or
    a location of the emergency guidance device.

4. The device of claim 1, where the first video call information includes information identifying at least one of:
  a video call application associated with the first user device;
  a video call application username associated with the first user device;
  a video call application password associated with the first user device;
  an email address associated with the first user device;
  an electronic serial number associated with the first user device;
  an IP address associated with the first user device; or
  a telephone number associated with the first user device; and
  where the second video call information includes information identifying at least one of:
    a video call application name associated with the emergency guidance device;
    a video call application username associated with the emergency guidance device;
    a video call application password associated with the emergency guidance device;
    an email address associated with the emergency guidance device;
    an electronic serial number associated with the emergency guidance device;
    an IP address associated with the emergency guidance device; or
    a telephone number associated with the emergency guidance device.

5. The device of claim 1, where the one or more processors, when obtaining the first video call information or the second video call information, are further to:
  receive the first video call information or the second video call information from a home subscriber server.

6. The device of claim 1, where the one or more processors, when determining that at least a portion of the first emergency information matches at least a portion of the second emergency information, are further to at least one of:
  compare a first emergency location associated with the first user device to a second emergency location associated with the second user device;
  compare a first emergency type associated with the first emergency call to a second emergency type associated with the second emergency call;
  compare a first emergency description associated with the first emergency call to a second emergency description associated with the second emergency call; or compare a first emergency call time associated with the first emergency call to a second emergency call time associated with the second emergency call.

7. A non-transitory computer-readable medium storing instructions, the instructions comprising:
one or more instructions that, when executed by a processor of a device, cause the processor to:
identify a first emergency call from a first user device;
determine that the first user device is to be connected on a video call;
identify an application on the first user device capable of being used by the first user device to connect on the video call;
obtain first video call information associated with the first user device,
the first video call information including information that permits the video call to be established by use of the application;
receive first emergency information associated with the first emergency call;
identify, based on the first emergency information, an emergency guidance device to which the first user device is to be connected via the video call;
obtain second video call information associated with the emergency guidance device,
the second video call information including information that permits the video call to be established by use of the application;
identify a second emergency call from a second user device;
obtain third video call information associated with the second user device,
the third video call information including information that permits the video call to be established by use of the application;
receive second emergency information associated with the second emergency call;
determine that at least a portion of the first emergency information matches at least a portion of the second emergency information; and
provide information to connect, via the application, the first user device and the second user device on the video call with the emergency guidance device based on determining that at least a portion of the first emergency information matches at least a portion of the second emergency information,
the information to connect being based on the first video call information, the second video call information, and the third video call information,
the video call being a video conference call between the first user device, the second user device, and the emergency guidance device.

8. The non-transitory computer-readable medium of claim 7, where the one or more instructions, that cause the processor to determine that the first user device is to be connected on the video call, further cause the processor to:
determine that the first user device is to be connected on the video call based on at least one of:
a user preference associated with the first user device;
a device type of the first user device;
an amount of network bandwidth associated with the first user device;
a location of the first user device;
a type of emergency associated with the first user device; or
a signal strength associated with the first user device.

9. The non-transitory computer-readable medium of claim 7, where the one or more instructions, that cause the processor to identify the emergency guidance device, further cause the processor to:
identify the emergency guidance device based on at least one of:
an emergency type associated with the emergency call;
an emergency location associated with the emergency call;
an emergency type associated with the emergency guidance device;
a device type of the emergency guidance device;
user information associated with the first user device;
a location of the first user device; or
a location of the emergency guidance device.

10. The non-transitory computer-readable medium of claim 7, where the first video call information includes information identifying at least one of:
a username associated with the application;
a password associated with the application;
an email address associated with the first user device;
an electronic serial number associated with the first user device;
an IP address associated with the first user device; or
a telephone number associated with the first user device.

11. The non-transitory computer-readable medium of claim 7, where the one or more instructions, that cause the processor to obtain the first video call information or the second video call information, further cause the processor to:
receive the first video call information or the second video call information from a home subscriber server.

12. The non-transitory computer-readable medium of claim 7, where the one or more instructions, that cause the processor to determine that at least a portion of the first emergency information matches at least a portion of the second emergency information, further cause the processor to:
compare a first emergency location associated with the first user device to a second emergency location associated with the second user device;
compare a first emergency type associated with the first emergency call to a second emergency type associated with the second emergency call;
compare a first emergency description associated with the first emergency call to a second emergency description associated with the second emergency call; or
compare a first emergency call time associated with the first emergency call to a second emergency call time associated with the second emergency call.

13. The non-transitory computer-readable medium of claim 7, where the video conference call is between a plurality of user devices and the emergency guidance device,
the plurality of user devices including the first user device and the second user device,
where the one or more instructions, when executed by the processor, further cause the processor to:
determine a video call application that is capable of being used by a greatest number of the plurality of user devices,
the video call application being the application,
where the one or more instructions, that cause the processor to provide the information to connect the first user device and the second user device on the video call with the emergency guidance device, further cause the processor to:

provide the information to connect, via the video call application, the first user device and the second user device on the video call with the emergency guidance device.

14. The non-transitory computer-readable medium of claim 7, where the plurality of user devices include a third user device that is not capable of using the video call application,
where the one or more instructions, when executed by the processor, further cause the processor to:
provide information to connect the third user device on the video call by voice.

15. A method, comprising:
receiving, by a device, a first invitation,
the first invitation including an invitation to connect a user device and an emergency call device on a first call;
receiving, by the device, first call information based on the first invitation,
the first call information including information that permits the first call to be established;
connecting, by the device, the user device and the emergency call device on the first call based on the first invitation and based on the first call information;
receiving, by the device, emergency information associated with the first call,
the emergency information indicating an emergency;
receiving, by the device, an indication that the user device is to be connected to an emergency guidance device on a second call;
receiving, by the device, a second invitation,
the second invitation including an invitation to connect the user device and the emergency guidance device on the second call;
receiving, by the device, second call information based on the second invitation,
the second call information including information that permits the second call to be established;
determining, by the device and based on the second call information, the emergency guidance device; and
connecting, by the device, the user device and the emergency guidance device on the second call based on the second call information and based on determining the emergency guidance device,
the second call being a conference call between the user device, the emergency guidance device, and another user device,
the other user device having made an emergency call related to a same emergency indicated by the emergency information associated with the first call.

16. The method of claim 15, where the first invitation includes a first session initiation protocol invite message;
where the first call information includes a first session description protocol message,
the first session description protocol message including at least one of:
an indication of a capability of the user device, or
an indication of a capability of the emergency call device;
where receiving the indication that the user device is to be connected to an emergency guidance device includes receiving a session initiation protocol refer message;
where the second invitation includes a second session initiation protocol invite message;
where the second call information includes a second session description protocol message,
the second session description protocol message including at least one of:
an indication of a capability of the user device, or
an indication of a capability of the emergency guidance device; and
where determining the emergency guidance device further comprises:
determining the emergency guidance device based on the second session description protocol message.

17. The method of claim 15, further comprising:
replicating the second call; and
providing the second call to the emergency call device based on replicating the second call.

18. The method of claim 15, where receiving the indication that the user device is to be connected to the emergency guidance device on the second call further comprises:
determining that the user device is to be connected on the second call based on at least one of:
a user preference associated with the user device;
a device type of the user device;
an amount of network bandwidth associated with the user device;
location of the user device; or
a signal strength associated with the user device.

19. The method of claim 15, where determining the emergency guidance device further comprises:
determining the emergency guidance device based on at least one of:
an emergency type associated with the first call;
an emergency location associated with the first call;
an emergency type associated with the emergency guidance device;
a device type of the emergency guidance device;
user information associated with the user device;
a location of the user device; or
a location of the emergency guidance device.

20. The method of claim 15, where the second call is a video call.

* * * * *